Feb. 20, 1940.  L. WENCZLER  2,190,815
AUTOMATIC FOCUSING DEVICE
Filed May 31, 1938
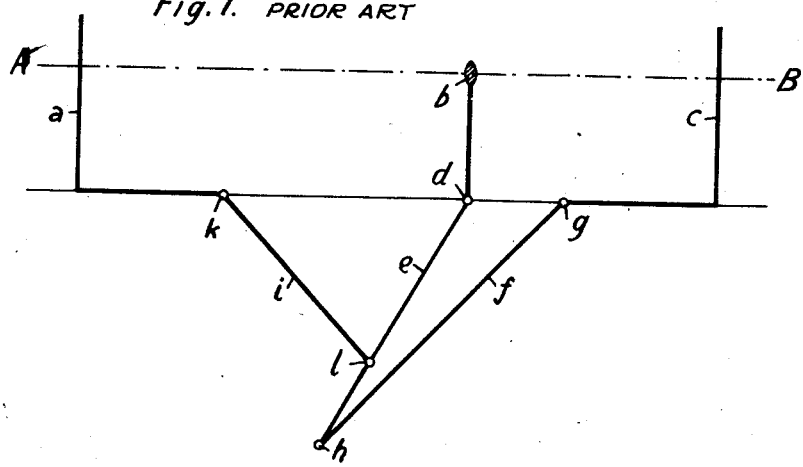
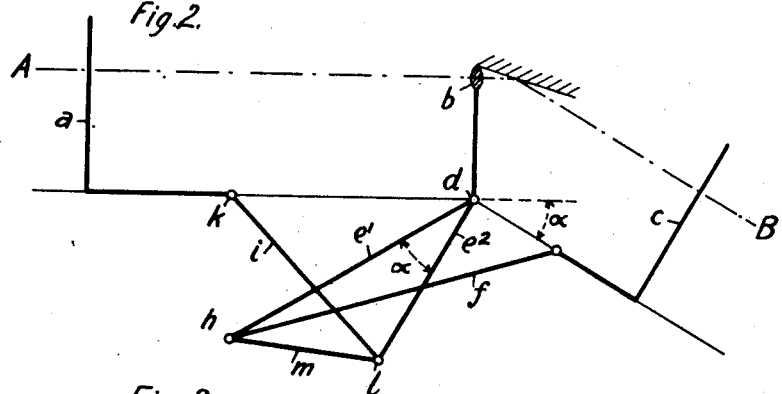
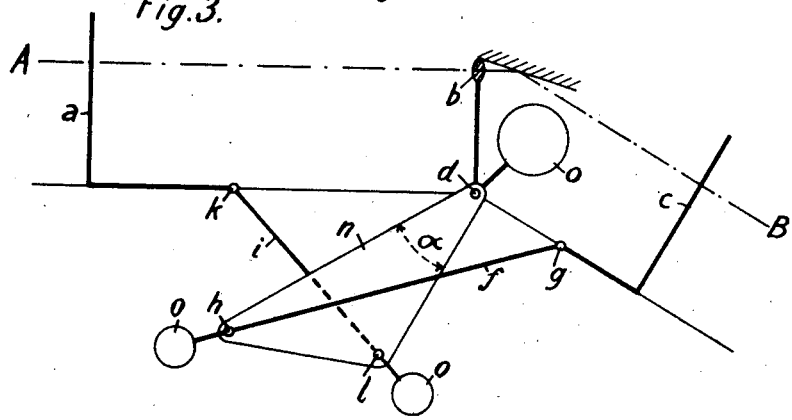
Inventor:
Ludwig Wenczler

UNITED STATES PATENT OFFICE 2,190,815

AUTOMATIC FOCUSING DEVICE

Ludwig Wenczler, Berlin-Nikolassee, Germany

Application May 31, 1938, Serial No. 211,051
In Germany June 8, 1937

1 Claim. (Cl. 88—24)

In cameras in which the rays travel in a straight line, it is known to use for obtaining positive adjustment of the object and image distances, a linkage with three links of which one is mounted so as to pivot about a pin which is stationary in relation to the objective lens and is pivotally connected both to the carrier for the object (copy) and the carrier for the projection surface (dark slide holder).

It is also known in the case of rays proceeding at an angle, to use a lever which is mounted so as to rotate about a point which is stationary in relation to the objective and engaging the dark slide and copy holders by means of rotatable sliding members.

The unavoidable bending of this lever makes it impossible to obtain sharp focusing, especially with a large degree of enlargement or reduction. The more this deviates from the ratio 1:1 the more effective becomes the lever, and with it also the bending of the lever, so that, especially in the end positions, there are detrimental deviations from the correct adjustment. The invention has the object of avoiding the above-mentioned drawbacks in photographic cameras with rays proceeding at an angle.

This object is achieved according to the invention by means of a linkage containing a rigid body which is supported so as to be rotatable about a point which is stationary in relation to the objective lens and is pivotally connected by means of two further pivotal points and connecting rods attached thereto with the copy holder and the dark slide holder.

A constructional example of the arrangement according to the invention is illustrated in the accompanying drawing.

Fig. 1 shows, for purposes of comparison, the known type of linkage.

Fig. 2 shows the invention diagrammatically.

Fig. 3 shows the triangular reinforcement as a practical application of the invention.

The invention differs fundamentally from the known arrangements in that the centre piece $e$ having the three joints $d$, $l$, $h$, of which the point $l$ is connected through the link $i$ with the dark slide holder $a$ at the point $k$ and the point $h$ is connected through the link $f$ with the copy holder $c$ at the point $g$, is divided into two links $e^1$ and $e^2$, of which the latter corresponds in position to the previously known link $e$, while the former is offset with respect to the link $e^2$, at the same angle $\alpha$ and in the same direction in which the optic axis A—B is deviated from the straight line A—B in Fig. 1. In this way there is obtained a triangular body bounded by the links $e^1$, $e^2$ which is reinforced by the insertion of the connecting rod $m$.

Fig. 3 shows the construction as a triangular body $n$. In order to save weight, preferably a triangular grid will be used.

The linkage according to the invention can be adjusted either by rotating the triangle or displacing the copy holder $c$ or the dark slide holder $a$ in a straight line.

The invention also includes the proposal that, when the system is arranged in the vertical plane and is adjusted in a straight line, weights are provided so that the triangular member $n$ is completely balanced and when effecting an adjustment the weight of the linkage does not have to be overcome by the force producing the adjustment. The weights are indicated by $o$ in Fig. 3. Advantageously, the invention will be employed in cases where the angle $\alpha$ is equal to 90°.

What I claim is:

In an apparatus for the positive adjusting the distances of a dark slide holder and a copy holder with relation to an objective lens of a photographic camera in which the rays from the copy to the lens make an angle with the rays from the lens to the dark slide, in combination, two levers which are rotatable about a point which is fixed with relation to the objective lens, and are connected in position with the same angle between them as between the light rays on opposite sides of the lens, a link connecting one of the levers with the copy holder, and another link connecting the other lever with the dark slide holder.

LUDWIG WENCZLER.